United States Patent
Teufl et al.

(10) Patent No.: US 9,648,665 B2
(45) Date of Patent: May 9, 2017

(54) HEATING SYSTEM COMPONENT HAVING TEMPERATURE MONITORING AND/OR CONTROL UNIT ATTACHED TO CARRIER UNIT WITH WELDED SEAM AND RELATED METHOD

(71) Applicant: Bleckmann GmbH & Co. KG, Lamprechtshausen (AT)

(72) Inventors: Gernot Teufl, Hallein (AT); Gerhard Weber, Moosdorf (AT)

(73) Assignee: Bleckmann GmbH & Co. KG, Lamprechtshausen (AT)

(*) Notice: Subject to any disclaimer, the term of this patent is extended or adjusted under 35 U.S.C. 154(b) by 0 days.

(21) Appl. No.: 14/747,913

(22) Filed: Jun. 23, 2015

(65) Prior Publication Data

US 2015/0373780 A1    Dec. 24, 2015

(30) Foreign Application Priority Data

Jun. 24, 2014   (EP) .................................... 14173711
Jun. 19, 2015   (EP) .................................... 15173012

(51) Int. Cl.
*H05B 1/02*        (2006.01)
*F24H 9/20*        (2006.01)
*G01K 1/14*        (2006.01)
*B23K 26/24*       (2014.01)

(52) U.S. Cl.
CPC .............. *H05B 1/02* (2013.01); *B23K 26/24* (2013.01); *F24H 9/2028* (2013.01); *G01K 1/14* (2013.01); *H05B 1/0297* (2013.01); *F24D 2220/042* (2013.01)

(58) Field of Classification Search
CPC ....... H05B 1/02; H05B 1/0297; F24H 9/2028; G01K 1/14; F24D 2220/042; B23K 26/24
USPC ..... 219/494, 212–214, 443.1, 446.1, 448.11, 219/448.17, 448.18, 121.63, 121.64, 219/412–414
See application file for complete search history.

(56) References Cited

U.S. PATENT DOCUMENTS 3,382,717 A    5/1968   Keppel et al.
4,412,122 A *  10/1983  Bohm ................. B23K 33/008
                                                      219/137 R (Continued)

FOREIGN PATENT DOCUMENTS

BE          678103       9/1966
GB         2 262 594 A   6/1993
WO       2008/125875 A2  10/2008

OTHER PUBLICATIONS

European Patent Office; European Search Report mailed Dec. 4, 2014; 8 pages.

*Primary Examiner* — Mark Paschall
(74) *Attorney, Agent, or Firm* — Seed IP Law Group LLP

(57) ABSTRACT

The present disclosure relates to a heating system component including a temperature monitoring and/or control unit comprising a lower surface, and a carrier unit comprising an upper surface. At least a part of said lower surface of said temperature monitoring and/or control unit is in thermal contact with at least a part of said upper surface of said carrier unit. Said lower surface of said temperature monitoring and/or control unit and said upper surface of said carrier unit are attached to each other by means of a welded seam, preferably by means of a laser-welded seam.

15 Claims, 10 Drawing Sheets

(56) References Cited

U.S. PATENT DOCUMENTS

| | | | | |
|---|---|---|---|---|
| 5,459,812 | A * | 10/1995 | Taylor | H05B 3/82 |
| | | | | 392/498 |
| 7,005,607 | B2 * | 2/2006 | Takatani | B23K 9/022 |
| | | | | 219/124.34 |
| 9,215,758 | B2 * | 12/2015 | Imura | H05B 1/0266 |
| 2006/0236999 | A1 * | 10/2006 | Pleschinger | F24H 9/2028 |
| | | | | 126/373.1 |
| 2011/0094093 | A1 * | 4/2011 | Goldstein | A61N 1/368 |
| | | | | 29/623.2 |

* cited by examiner

A

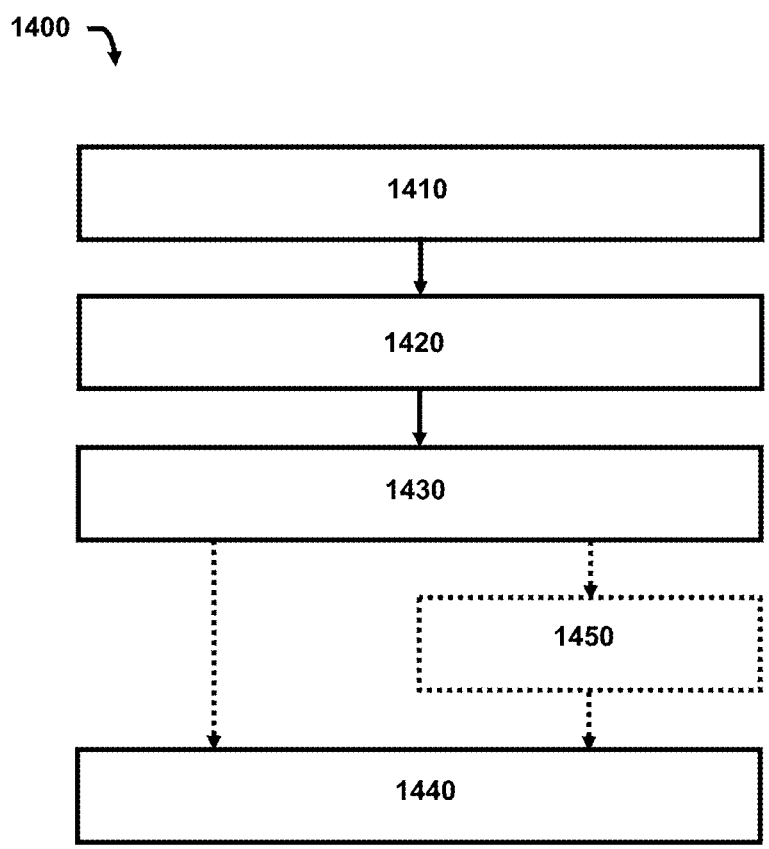

HEATING SYSTEM COMPONENT HAVING TEMPERATURE MONITORING AND/OR CONTROL UNIT ATTACHED TO CARRIER UNIT WITH WELDED SEAM AND RELATED METHOD

BACKGROUND

Technical Field

The present disclosure relates to a heating system component, to a heating system for heating fluid media, and to a method for producing a heating system component.

Description of the Related Art

For many types of domestic appliances or domestic machines, it is necessary to heat up a fluid medium, such as for example water. Heating up can be caused by means of one or more heating systems. To that extent, a medium circuit can be provided, a pump arranged in the circuit causing circulation of the medium in the circuit.

Basic aspects of such heating systems are that, like all other components of the medium circuit, the system is to take up only a small amount of space and is to be inexpensive to produce. Furthermore, the heating system shall be simple to assemble. Reliable safeguarding of the heating system must be guaranteed upon the occurrence of a critical operating condition which can result in plastic components within the domestic appliance melting or catching fire. In case of some domestic appliances, it may further be necessary to prevent the medium to be heated from exceeding a predetermined temperature. For example in the case of a dishwashing machine, it may be necessary to prevent the washing water from exceeding its boiling temperature.

US patent application 2006/0236999 A1 discloses a heating system for heating fluid media, in particular for domestic appliances, including a carrier unit, a heating unit arranged on the carrier unit and a heat transfer element which is arranged on the carrier unit and comprising a material which is a good conductor of heat. On the heat transfer element, temperature safety devices are mounted by fixing elements via corresponding through apertures.

When using conventional temperature monitoring and/or control elements (such as, e.g., thermal fuses) with continuous-flow water heaters, there is a problem when the temperature monitoring and/or control elements are fixed with, e.g., one or more screws, to a mounting plate. That is, when the mounting plate is soldered to the heating unit, it may curve. Further, when fastening respective fixing screws on a temperature monitoring and/or control element, the temperature monitoring and/or control element may be lifted from the fixing plate and remain in the air above the hot location. As a consequence, the largest amount of heat in the center of the heating unit cannot be released directly to the temperature monitoring and/or control element, but has to be released via, e.g., the mounting plate, screws, and/or the base plate flange. These effects result in an unacceptable (i.e., too slow) response time of the temperature monitoring and/or control element.

BRIEF SUMMARY

Embodiments of the present invention provide a heating system component, a heating system, and a method for producing a heating system component, which avoid the slow response times of prior-art arrangements.

According to a first aspect of the present invention, there is provided a heating system component comprising: a temperature monitoring and/or control unit comprising a lower surface; a carrier unit comprising an upper surface; wherein at least a part of said lower surface of said temperature monitoring and/or control unit is in thermal contact with at least a part of said upper surface of said carrier unit; wherein said lower surface of said temperature monitoring and/or control unit and said upper surface of said carrier unit are attached to each other by means of a welded seam, preferably by means of a laser-welded seam.

Embodiments of the present invention propose to fix the temperature monitoring and/or control element onto the heating unit, preferably in the direct vicinity of the hottest spot thereof, by means of a welded seam. Preferably, the fixing is carried out by welding, in particular by laser welding. In general, employing laser welding for attaching temperature monitoring and/or control elements in heating systems involves the advantage of higher functionality and security as compared to prior art mounting approaches using, e.g., curved spring washers. In particular, fixing the temperature monitoring and/or control element onto the heating unit by welding significantly improves (i.e., reduces) the temperature monitoring and/or control element's response time.

According to a preferred embodiment, said temperature monitoring and/or control unit comprises a lower part having a beveled edge; wherein said beveled edge is adjacent to said lower surface; wherein said beveled edge comprises a bevel angle of less than 90°; wherein said welded seam is located essentially along said beveled edge. By employing a beveled edge having a bevel angle of less than 90°, it is easier to reach the contact area between the temperature monitoring and/or control unit's lower surface and the carrier unit's upper surface with a laser beam. As a consequence, less laser power is needed, while still achieving the desired strength of attachment between the temperature monitoring and/or control unit's lower surface and the carrier unit's upper surface.

During the use of a heating system, it is possible that scale or calcium is deposited on the side of the carrier unit being in contact with the fluid medium to be heated, like water, in particular in the area of the carrier unit when the heating unit is arranged on the other side of the carrier unit. Due to this calcium deposit, the transfer of the heat generated by the heating unit, can be impaired. Thus, the temperature monitoring and/or control element can detect a temperature being higher than a temperature without such a calcium deposit. In some cases, the temperature monitoring and/or control element can then cut-off the electricity supply to the heating unit although the medium is still present, i.e. the temperature monitoring and/or control unit detects a safety relevant situation, like a dry run. In order to avoid this, it could be of advantage to provide a connection to the thermal monitoring and/or control element such that the connection is in contact with an area of carrier unit being spaced to the heating unit. Through this, the temperature monitoring and/or control unit can be cooled by the medium so that the temperature detection is not impaired by the calcium deposit on the carrier unit in the area of the heating unit. This connection can also be laser-welded to the carrier unit wherein the connection can also be provided with a beveled edge. The dimensions of that connection can be chosen in accordance with the need to cool the temperature monitoring and/or control unit.

Moreover, it is also possible to attach the temperature monitoring and/or control unit directly on the top surface of the heating unit.

According to a further preferred embodiment, said bevel angle ranges between 5° and 55°, preferably between 15° and 45°, and even more preferably between 25° and 35°. By choosing a bevel angle as described, reaching the contact area between the temperature monitoring and/or control unit's lower surface and the carrier unit's upper surface with a laser beam is made even easier and thus improved. Further, by increasing the respective melting zone, a complete material connection can be achieved. Providing a beveled edge of a certain length in addition compensates for a potential mispositioning during automatic production. When aiming for a laser entrance angle on the material surface of 90°, a bevel angle of preferably 30° may be chosen so that the laser beam can be directed at an angle of 120° with respect to the carrier unit's upper surface. The laser beam can thus be prevented from getting too close to the sensitive parts of the temperature monitoring and/or control unit.

According to a further preferred embodiment, said temperature monitoring and/or control unit is configured to measure a temperature, to compare said temperature to a predefined temperature limit, and to output a control signal based on said comparison.

According to a further preferred embodiment, said control signal comprises information on a desired switching state of a heating unit.

According to a further preferred embodiment, said lower surface of said temperature monitoring and/or control unit comprises at least one first protrusion and/or recess. Said upper surface of said carrier unit comprises at least one second recess and/or protrusion. Said first protrusion and/or recess corresponds to said second recess and/or protrusion. By designing the temperature monitoring and/or control unit's lower surface and the carrier unit's upper surface in the described manner, the total contact area can be increased, thus providing for an improved heat transport between carrier unit and temperature monitoring and/or control unit. The design further enables an easier manufacture given the preferred matching of protrusions and recesses.

According to a further preferred embodiment, said lower surface of said temperature monitoring and/or control unit comprises AlMg3. However, any other weldable aluminum alloys or aluminum-steel compound material can be used.

According to a further preferred embodiment, said upper surface of said carrier unit comprises AlMg3. However, aluminum alloys Al99,5 and AlMg1 are suitable as well.

According to a further preferred embodiment, said temperature monitoring and/or control unit comprises at least one temperature monitoring and/or control element having a lower surface which is smaller than said lower surface of said temperature monitoring and/or control unit. By designing the temperature monitoring and/or control element such that it comprises a lower surface which is smaller than said lower surface of said temperature monitoring and/or control unit, it is possible to have the lower surface of said temperature monitoring and/or control unit extending beyond the lower surface of said temperature monitoring and/or control element. The temperature monitoring and/or control unit's lower surface can thus be reached in an easier manner in order to attach the temperature monitoring and/or control unit to the carrier unit.

According to another aspect of the present invention, there is provided a heating system for heating fluid media, in particular for domestic appliances, comprising: a heating system component as described herein, a heating unit arranged on said carrier unit, and wherein said temperature monitoring and/or control unit is configured to measure the temperature of said heating unit.

According to a preferred embodiment, the heating system comprises a casing portion, wherein the heating unit is mounted to said casing portion, and wherein the casing portion comprises aluminum. Even more preferably, the entire heating system is composed of aluminum. Whereas conventional heating systems typically provide a recess in a carrier unit, where the heating unit is arranged within the recess, the preferred embodiment described herein advantageously makes it possible to mount (e.g., by soldering) a heating unit directly to a casing portion of the carrier unit. The carrier unit is thus structurally simplified, because a recess is no longer necessary. Further, the inner side of the casing portion is preferably coated with a nonstick coating. The nonstick coating is preferably composed of a ceramics-based material. By employing a ceramics-based nonstick coating, the aluminum surfaces may be rendered dishwasher-safe.

According to a preferred embodiment, the heating unit comprises a heat transfer element, wherein said heat transfer element is an elongate flat element. According to a further preferred embodiment, the carrier unit comprises a disc. According to a further preferred embodiment, the carrier unit has a recess which is open at one side and which is preferably at least approximately C-shaped in cross-section for receiving the heating unit. According to a further preferred embodiment, the heating unit is formed by at least one tubular heater. According to a further preferred embodiment, the cross-sectional shape of the heating unit is at least approximately adapted to the cross-sectional shape of the recess of the carrier unit.

According to another aspect of the present invention, there is provided a method for producing a heating system component as described herein. The method comprises: providing a temperature monitoring and/or control unit comprising a lower surface; providing a carrier unit comprising an upper surface; contacting at least a part of said lower surface of said temperature monitoring and/or control unit with at least a part of said upper surface of said carrier unit; welding, preferably laser-welding, said lower surface of said temperature monitoring and/or control unit and said upper surface of said carrier unit to each other.

According to a preferred embodiment, the method further comprises beveling an edge of a lower part of temperature monitoring and/or control unit to obtain a beveled edge, wherein said beveled edge comprises a bevel angle of less than 90°; wherein said welding is carried out essentially along said beveled edge. According to a further preferred embodiment, said welding comprises laser-welding by employing a laser beam, and said laser beam is directed essentially perpendicular to a surface of said temperature monitoring and/or control unit. According to a further preferred embodiment, said laser beam comprises a power of between 0.5 kW and 1.5 kW, preferably of 1 kW.

It shall be understood that the heating system components, the heating systems for heating fluid media, and the methods for producing a heating system component described herein may have similar and/or identical aspects.

It shall be understood that a preferred embodiment of the invention can also be any combination of features set forth in the claims.

These and other aspects of the invention will be apparent from and elucidated with reference to the embodiments described hereinafter.

BRIEF DESCRIPTION OF THE DRAWINGS

In the following drawings:

FIG. 16 shows schematically and exemplarily an embodiment of a method for producing a heating system component.

DETAILED DESCRIPTION

One concern with heating systems is reliable safeguarding against overheating. Typically, protection against overheating is achieved by employing temperature monitoring and/or control elements, such as, e.g., thermostats and/or thermal links. Temperature monitoring and/or control elements tend to be used in applications where a fixed temperature needs to be monitored or controlled and a maximum temperature must not be exceeded. Example applications include, but are not limited to, household appliances such as dishwashers and washing machines, small electrical appliances such as coffeemakers, steam generators etc. or electrically monitored water heaters.

As a temperature sensing element, e.g., a vaulted bimetal disc may be used. The vaulted bimetal disc is preferably placed in direct contact with a mounting plate therefore reacting quickly to temperature. Having reached a predetermined temperature the bimetal disc operates and opens an electrical circuit. Once the temperature has fallen again under the predetermined temperature, the disc returns into its original position thereby closing the circuit again. Additionally and/or alternatively, a solder insert in the mounting plate may be in direct thermal contact with the surface that is to be monitored. When the preset temperature is reached, the solder melts causing a pin to move which results in the electrical contacts opening. For a two-component system combining temperature monitoring and temperature control, the two components temperature monitor and temperature control may have a common mounting plate, which is responsible for thermal conduction. This ensures that the thermal information for thermostat and thermal link always comes from the same source.

Temperature control elements may be used for applications where a maximum temperature must not be exceeded (such as, e.g., for example in coffee makers, irons, dishwashers, dryers) and to protect electric heating elements. A temperature control element typically has a melt solder insert in the mounting plate which is in direct thermal contact with the surface that is to be monitored. When the preset temperature is reached, the solder melts causing a pin to move which results in the electrical contacts opening.

Figure 1:
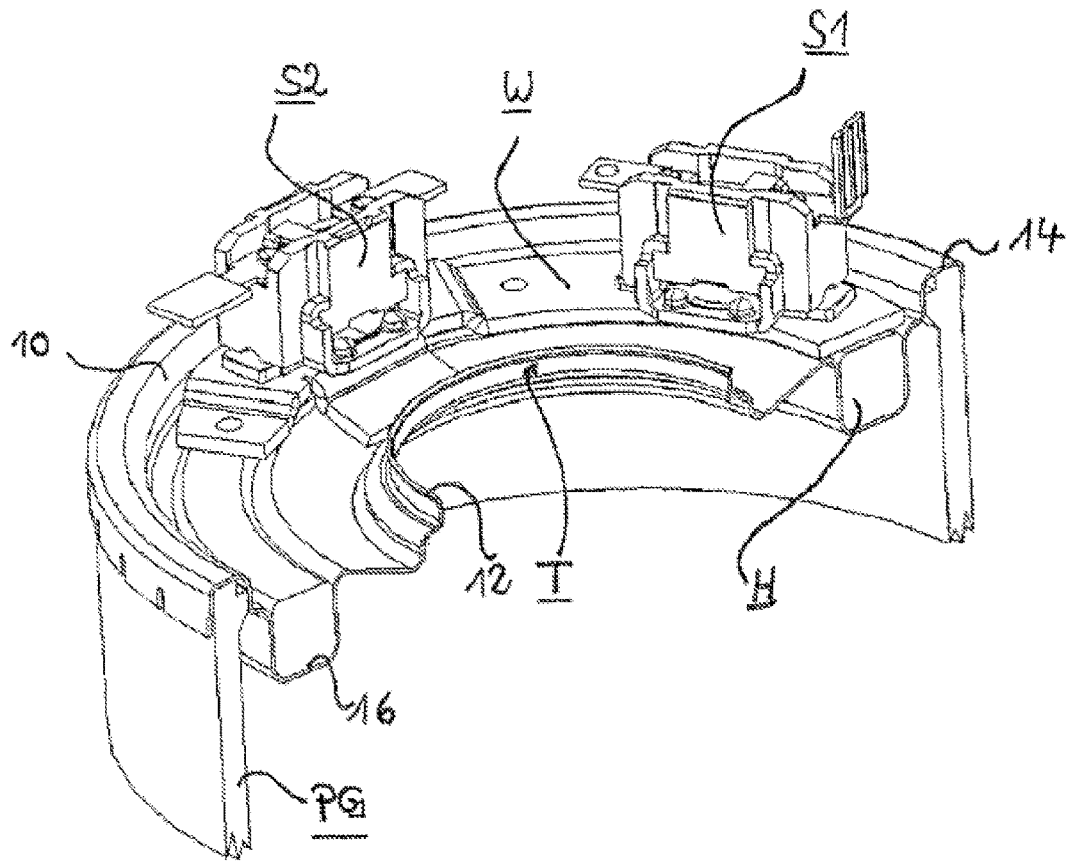
FIG. 1 shows schematically and exemplarily a perspective sectional view of part of a prior-art heating system.

FIG. 1 shows schematically and exemplarily a conventional heating system as disclosed in US patent application 2006/0236999 A1, which is incorporated herein by reference. The heating system of FIG. 1 comprises a carrier unit T, a heating unit H, a heat transfer element W, and safety devices S1, S2 arranged on the heat transfer element W. The first safety device S1 interrupts the power circuit to the heating unit H, based on the temperature of the heating unit H, which is detected by the first safety device S1. First safety device S1 preferably interrupts the power circuit to the heating unit H when the temperature of the heating unit H exceeds a first predetermined temperature limit value, for example when the heating unit H runs dry. The first predetermined temperature limit value may be chosen such that melting of plastic parts in the region of the heating system is avoided. The second safety device S2 interrupts the power circuit to the heating unit H based on the temperature of the medium to be heated, which is detected by the second safety device S2. Second safety device S2 preferably interrupts the power circuit to the heating unit H when the temperature of the medium to be heated exceeds a second predetermined temperature limit value which can be defined for example by the boiling temperature of the medium to be heated. Consequently the medium is prevented from boiling. Safety devices S1, S2 may be considered temperature monitoring and/or control elements.

The heating system may be connected to, e.g., a conveyor pump of a dishwashing machine, of which only the housing PG comprising a plastic material with a low melting point is shown in part in FIG. 1. The heating system can be mounted to the conveyor pump or the housing PG thereof during assembly of the domestic appliance or can form a preassembled structural unit together with the conveyor pump.

As can be seen from FIG. 1, carrier unit T is a circular disc 10 which may be produced, e.g., from corrosion-resistant steel. In concentric relationship with its central axis (not shown) disc 10 has a circular hole 12, through which the suction pipe of the pump is passed in sealing integrity in relation to the medium. At its outer peripheral edge 14, disc 10 may engage over the edge of the pump housing PG in sealing integrity in relation to the medium. That side of disc 10, which faces in the direction of the lower edge of the sheet in FIG. 1, is in direct contact with the medium to be heated in the installed condition of the pump and can therefore be referred to as the wet side whereas the side of the disc 10, which faces towards the upper edge of the sheet, does not come into contact with the medium and can thus be referred to as the dry side.

As can further be seen from FIG. 1, disc 10 forming carrier unit T has a recess 16 which extends there around in concentric relationship with its central axis at approximately the radial center of the disc 10. Recess 16 is of a square configuration in cross-section, wherein one side of the square, being the upwardly facing side, is omitted. Heating unit H which is formed by a tubular heater of known kind is fitted in the recess 16. As can be seen from FIG. 1, the shape and the outside dimensions of heating unit H are matched to the shape and the outside dimensions of recess 16 in disc 10 in such a way that heating unit H is in full area contact at three sides against the inside walls (not identified in greater detail) of recess 16. Consequently, heat produced by heating unit H is transferred to the medium which is disposed on the wet side of disc 10 and which is to be heated.

Figure 2:
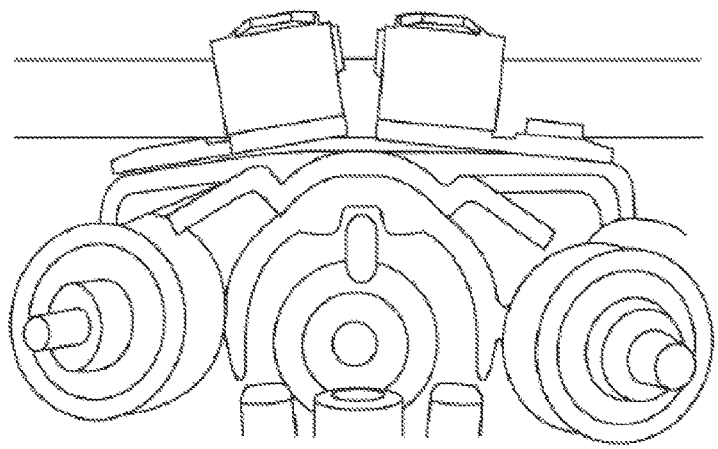
FIG. 2 shows schematically and exemplarily a cross sectional view of part of a prior-art heating system.

When using conventional temperature monitoring and/or control elements (such as, e.g., thermal fuses) with continuous-flow water heaters, there is a problem when the temperature monitoring and/or control elements are fixed with, e.g., one or more screws, to a mounting plate, as shown in FIG. 1 for the prior-art heating system shown therein. That is, when the mounting plate is soldered to the heating unit, it may curve. Further, when fastening respective fixing screws on a temperature monitoring and/or control element, the temperature monitoring and/or control element may be lifted from the fixing plate and remain in the air above the hot location. This effect is illustrated in FIG. 2 and indicated by an arrow. As a consequence, the largest amount of heat in the center of the heating unit cannot be released directly to the temperature monitoring and/or control element, but has to be released via, e.g., the mounting plate, screws, and/or the base plate flange. These effects result in an unacceptable (i.e., too slow) response time of the temperature monitoring and/or control element.

One idea to address the above-identified issue is to directly fix the temperature monitoring and/or control element onto the heating unit, preferably in the direct vicinity of the hottest spot thereof. The fixing may be carried out by welding, preferably by laser welding. In general, as set out in the following, employing laser welding for attaching temperature monitoring and/or control elements in heating systems involves the advantage of higher functionality and security as compared to prior art mounting approaches using, e.g., curved spring washers. In particular, fixing the temperature monitoring and/or control element onto the heating unit by welding significantly improves (i.e., reduces) the temperature monitoring and/or control element's response time.

Figure 3:
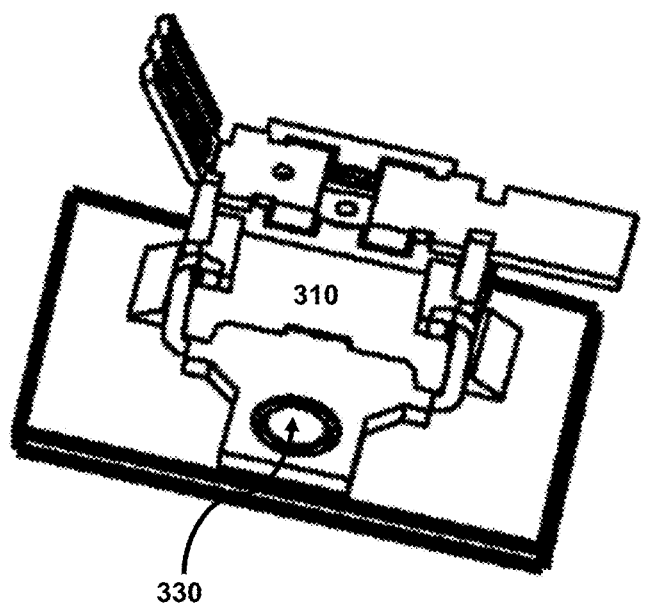
FIG. 3 shows schematically and exemplarily a top view of a temperature monitoring and/or control element.
Figure 4:
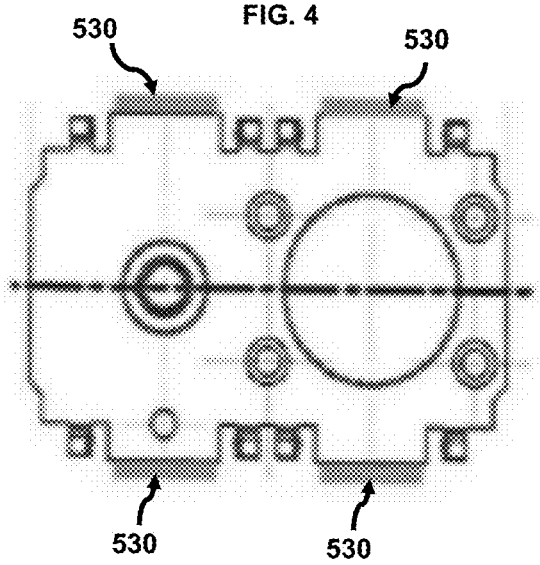
FIG. 4 shows schematically and exemplarily a top view of a temperature monitoring and/or control elements' base plate.

Several examples for fixing the temperature monitoring and/or control element onto the heating unit by welding are illustrated in the following. FIG. 3 shows schematically and exemplarily one option to fix the temperature monitoring and/or control element onto the heating unit by welding. That is, FIG. 3 shows a temperature monitoring and/or control element 310. A spot weld 330 on respective mounting portions of monitoring and/or control element 310 is illustrated as well. FIG. 4 shows schematically and exemplarily another option to fix the temperature monitoring and/or control element onto the heating unit by welding. That is, FIG. 4 shows a top view of a temperature monitoring and/or control elements' base plate comprising weld seams 530.

Figure 5A:
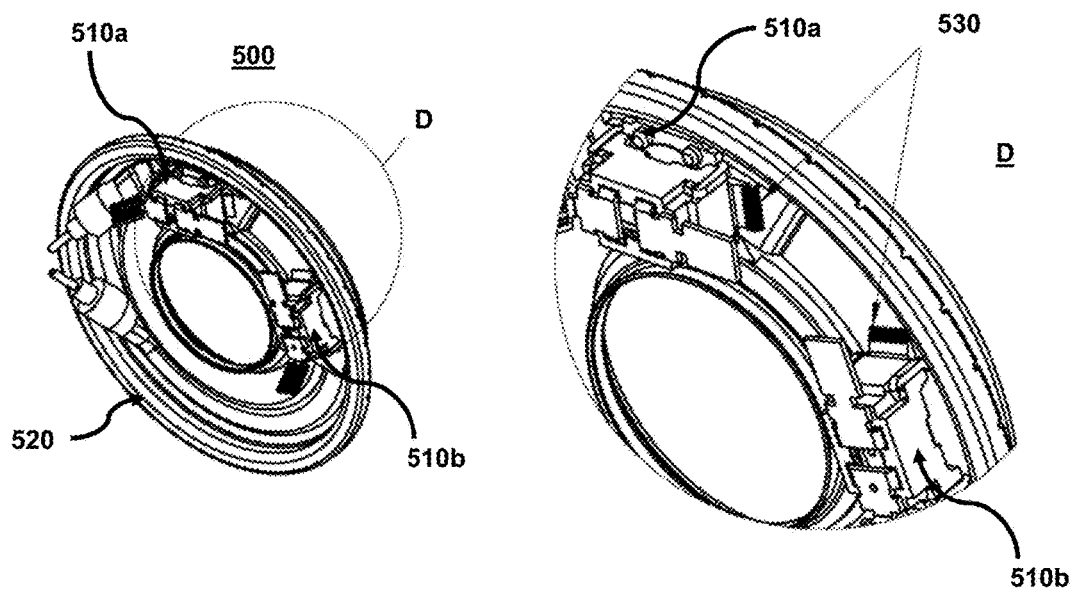
FIGS. 5A to 5C show schematically and exemplarily an embodiment of a temperature monitoring and/or control system comprising temperature monitoring and/or control elements.

FIG. 5A shows schematically and exemplarily an embodiment of a temperature monitoring and/or control system 500 comprising temperature monitoring and/or control elements 510a, 510b. Temperature monitoring and/or control elements 510a, 510b are mounted on a carrier unit 520. As further shown in the detailed view of area D of the left panel of FIG. 5A, Temperature monitoring and/or control elements 510a, 510b are mounted to carrier unit 520 via weld seams 530.

Figure 5B:
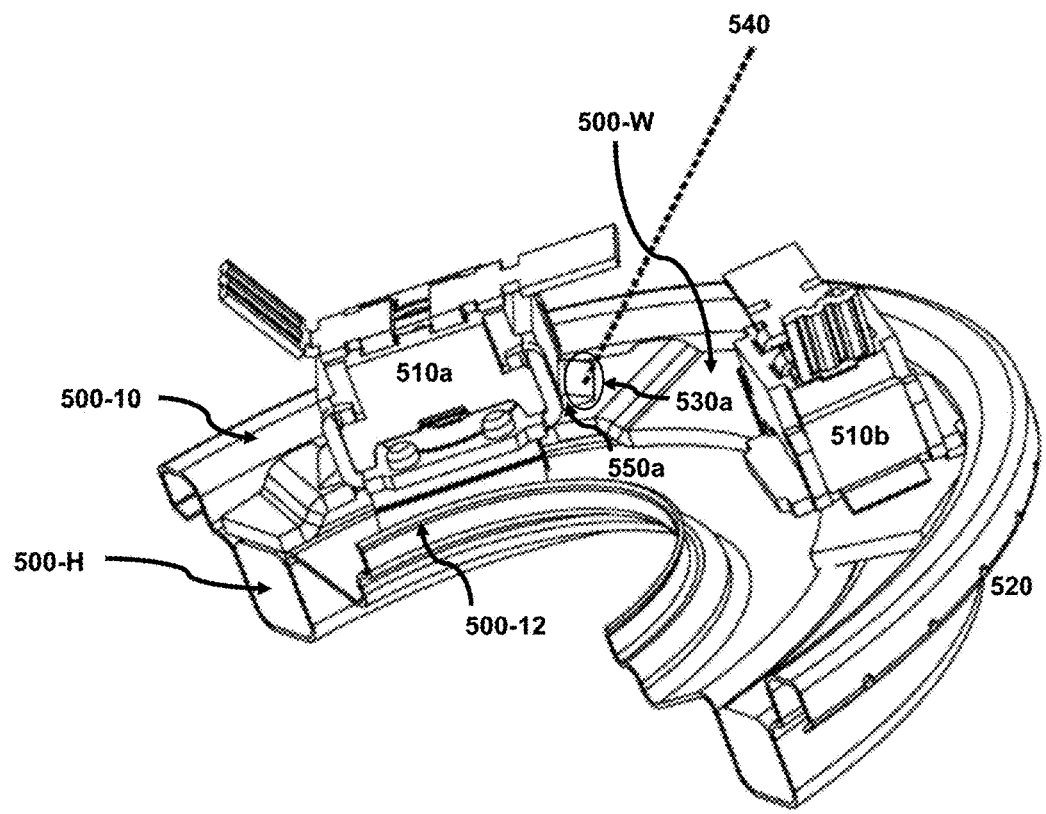
Figure 5C:
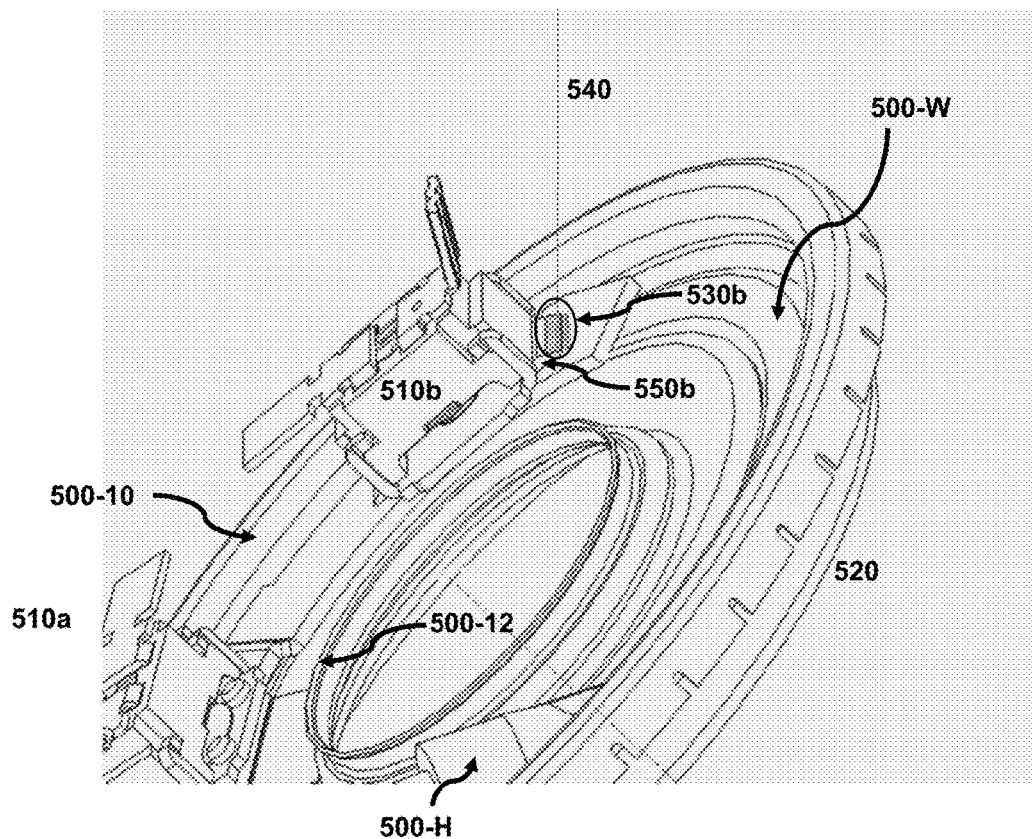

FIGS. 5B and 5C show schematically and exemplarily further views of temperature monitoring and/or control system 500. The heating system of FIGS. 5A to 5C comprises a carrier unit 520, a heating unit 500-H, a heat transfer element 500-W, and temperature monitoring and/or control units 510a, 510b, which may preferably be safety devices. Temperature monitoring and/or control units 510a, 510b are arranged on heat transfer element 500-W. A first temperature monitoring and/or control unit 510a interrupts the power circuit to the heating unit 500-H, based on the temperature of the heating unit 500-H, which is detected by the first temperature monitoring and/or control unit 510a. First temperature monitoring and/or control unit 510a preferably interrupts the power circuit to heating unit 500-H when the temperature of heating unit 500-H exceeds a first predetermined temperature limit value, for example when heating unit 500-H runs dry. The first predetermined temperature limit value may be chosen such that melting of plastic parts in the region of the heating system is avoided. A second temperature monitoring and/or control unit 510b interrupts the power circuit to heating unit 500-H based on the temperature of the medium to be heated, which is detected by second temperature monitoring and/or control unit 510b. Second temperature monitoring and/or control unit 510b preferably interrupts the power circuit to heating unit 500-H when the temperature of the medium to be heated exceeds a second predetermined temperature limit value which can be defined for example by the boiling temperature of the medium to be heated. Consequently the medium is prevented from boiling.

The heating system may be connected to, e.g., a conveyor pump of a dishwashing machine in a similar manner as the heating system shown in FIG. 1. The heating system can be mounted to the conveyor pump or to a housing thereof during assembly of the domestic appliance or can form a pre-assembled structural unit together with the conveyor pump.

As can be seen from FIGS. 5A to 5C, carrier unit 520 is a circular disc 500-10 which may be produced, e.g., from corrosion-resistant steel. However, in other embodiments of carrier unit 520, circular disc 500-10 may be produced, e.g., from AlMg3, AlMg1, or Al99,5. In concentric relationship with its central axis (not shown) disc 500-10 has a circular hole 500-12, through which the suction pipe of the pump is passed in sealing integrity in relation to the medium. At its outer peripheral edge, disc 500-10 may engage over the edge of a pump housing in sealing integrity in relation to the medium. That side of disc 500-10, which faces in the direction of the lower edge of the sheet in FIGS. 5A to 5C, is in direct contact with the medium to be heated in the installed condition of the pump and can therefore be referred to as the wet side whereas the side of the disc 500-10, which faces towards the upper edge of the sheet, does not come into contact with the medium and can thus be referred to as the dry side.

Disc 500-10 forming carrier unit 520 preferably has a recess which extends there around in concentric relationship with its central axis at approximately the radial center of disc 500-10. Said recess is preferably of a square configuration in cross-section, wherein one side of the square, being the upwardly facing side, is omitted. Heating unit 500-H which is preferably formed by a tubular heater of known kind is fitted in the recess. The shape and the outside dimensions of heating unit 500-H are preferably matched to the shape and the outside dimensions of the recess in disc 500-10 in such a way that heating unit 500-H is in full area contact at three sides against the inside walls of said recess. Consequently, heat produced by heating unit 500-H is transferred to the medium which is disposed on the wet side of disc 500-10 and which is to be heated.

As can further be seen from FIGS. 5B and 5C, a laser beam 540 may be employed to attach temperature monitoring and/or control units 510a, 510b to carrier unit 520. In particular, respective lower parts of temperature monitoring and/or control units 510a, 510b may comprise beveled edges 550a, 550b. By employing a beveled edge 550a or 550b, laser beam 540 can be directed such that it is prevented from getting too close to sensitive parts of temperature monitoring and/or control units 510a, 510b. A welded seam 530a, 530b is established along beveled edges 550a, 550b. Further details are explained herein below.

Figure 6:
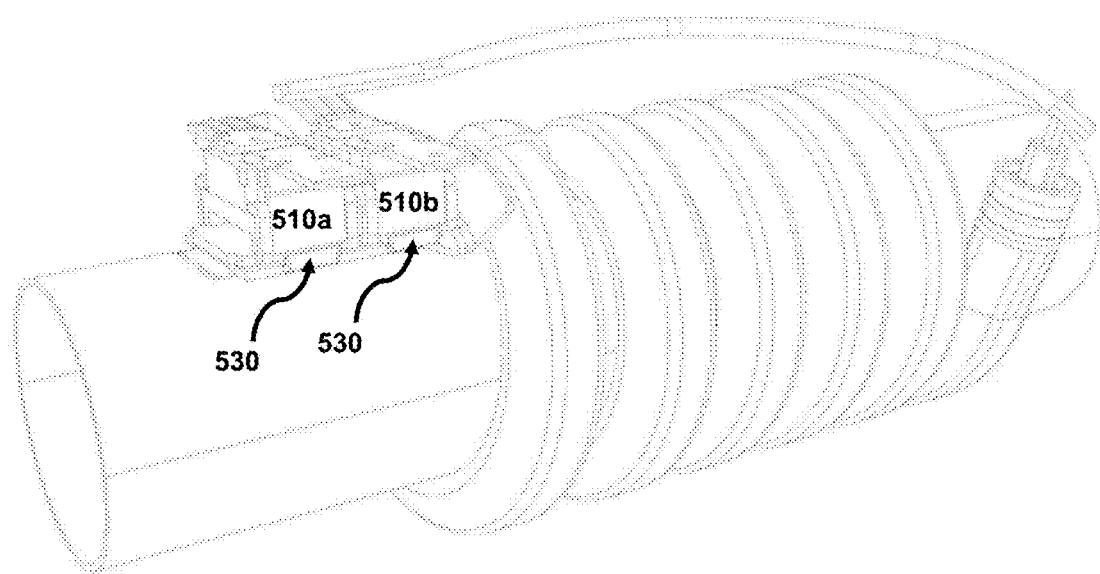
FIG. 6 shows schematically and exemplarily another embodiment of a temperature monitoring and/or control system comprising temperature monitoring and/or control elements.

FIG. 6 shows schematically and exemplarily another embodiment of a temperature monitoring and/or control system comprising temperature monitoring and/or control elements 510a, 510b mounted on a tube filed with a fluid to be heated, such as, e.g., a water pipe. Temperature monitoring and/or control elements 510a, 510b are fixed to the tube by means of laser weld seams 530.

In order to illustrate the effect of welding the temperature monitoring and/or control elements to the carrier unit, several test measurements have been carried out. In a first test experiment, a temperature monitoring and/or control element was fixed to a continuous-flow water heater by (a) pressing and (b) laser-welding. The test yielded a response time of the laser-welded temperature monitoring and/or control element which was two to four seconds shorter than the corresponding response time of the pressed temperature monitoring and/or control element. In addition, for case (b) overshoot was reduced by approximately 20° C.

Figure 7:
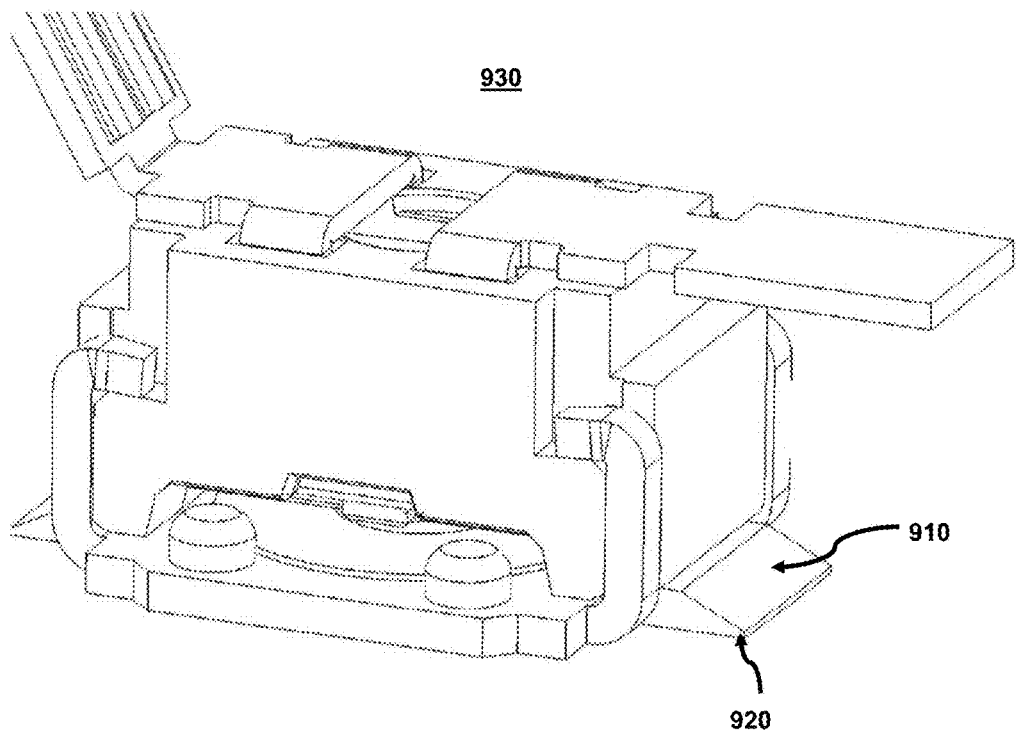
FIG. 7 shows schematically and exemplarily an embodiment of a temperature monitoring and/or control element having a bevel of approximately 30°.
Figure 8:
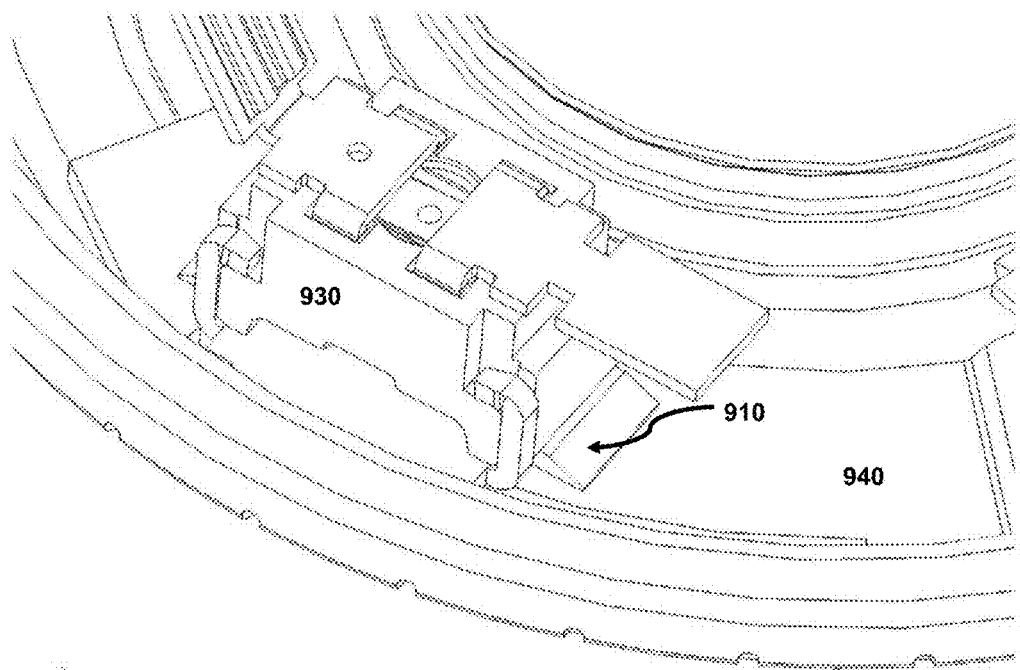
FIG. 8 shows schematically and exemplarily another view of the temperature monitoring and/or control element of FIG. 7.

In a further test experiment, there occurred a problem that, when fixing the temperature monitoring and/or control element to the base plate of a continuous-flow water heater, a high laser power of up to 2 kW (or even more) was necessary due to a disadvantageous laser entry angle. This yields an unsatisfactory welding result. One solution to improve the laser entrance into the base plate material (which may be preferably AlMg3) is illustrated in FIGS. 7 and 8 and relates to employing a bevel 910 (i.e., a beveled edge connecting the two adjacent surfaces) of preferably 25° to 35° at wing ends 920 of temperature monitoring and/or control element 930. Bevel 910 is preferably punched or stamped into wing ends 920. Punching or stamping is preferably carried out by means of a punch cutter or stamping tool, respectively.

Figure 9:
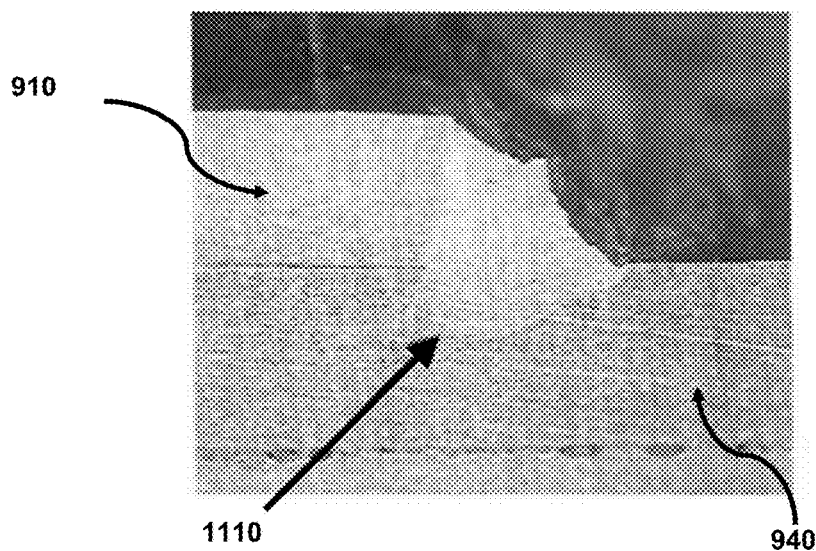
FIG. 9 shows schematically and exemplarily a beveled edge of a temperature monitoring and/or control element after welding.

Employing bevel 910 makes it easier for laser beam 540 to enter the material at a preferred angle of 90°. As a consequence of laser beam 540 entering at a more preferred angle, the welds turn solid and the melt enters the carrier plate 940 and wing ends 920 preferably in a cone-shaped manner. The conical entering of melt 1110 in the direction of the laser beam is shown in FIG. 9. In the test experiment described, a laser power of 1 kW was sufficient when using a 45°-bevel. As explained herein above, a bevel of 25° to 35° degrees is even more preferred. By applying a bevel to the wing ends of the temperature monitoring and/or control element, the laser power necessary to satisfactorily mount the temperature monitoring and/or control element can thus be reduced.

An optimal thermal coupling of temperature monitoring and/or control element to the heating system results in an improved heat transfer and shorter response time. Consequently, strong heating powers can be controlled in a secure manner and positive effects on scaling of the tubes are observed. By welding the temperature monitoring and/or control element to the heating system, less mounting elements are needed, because, e.g., fixing elements, such as, e.g., screws, may be omitted. Accordingly, the mounting is eased in general. Automating the coupling process is possible as well. In accordance with the improved thermal coupling, a higher temperature threshold of the temperature monitoring and/or control element may be chosen. Consequently, the temperature monitoring and/or control system is rendered more robust overall in view of a potential formation of scale of the heating surface.

Figure 10:
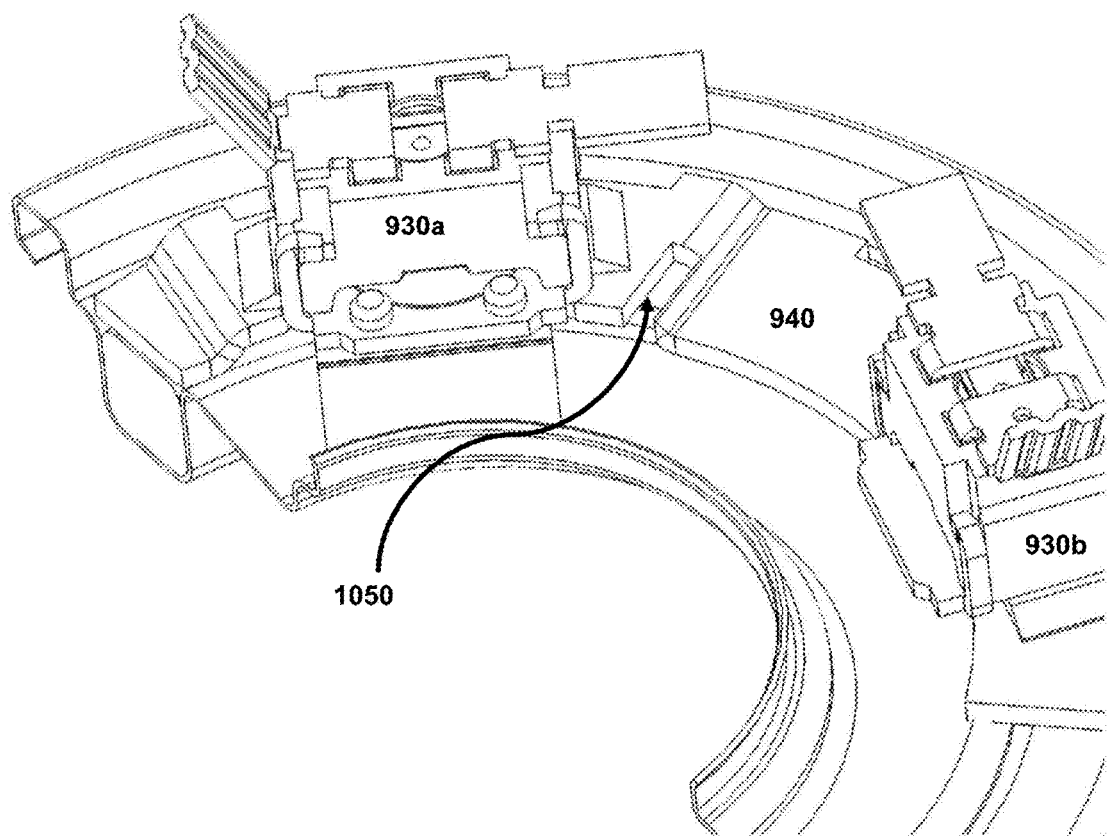
FIG. 10 shows schematically and exemplarily a further embodiment of a temperature monitoring and/or control system comprising temperature monitoring and/or control elements.

FIG. 10 shows schematically and exemplarily a further embodiment of a temperature monitoring and/or control system comprising temperature monitoring and/or control elements. In the embodiment of FIG. 10, cutout portion 1050 is provided in carrier plate 940. By means of cutout portion 1050, it is possible to define the quantity of heat transferred from a heat transfer element on carrier plate 940 to temperature monitoring and/or control element 930a. That is, by making cutout portion 1050 larger, the cross section area available for conducting heat is made smaller so that less heat is transferred to temperature monitoring and/or control element 930a. Alternatively, by making cutout portion 1050 smaller, the cross section area available for conducting heat is made larger so that more heat is transferred to temperature monitoring and/or control element 930a. Defining the heat quantity to be conducted to temperature monitoring and/or control element 930a may become necessary in order to account for the improved thermal coupling due to laser welding. That is, when pressing a conventional temperature monitoring and/or control element on a carrier plate, less heat is transferred to the conventional temperature monitoring and/or control element. The temperature monitoring and/or control element's temperature thresholds are accordingly adjusted to trigger when a certain amount of heat has been received. With the improved thermal coupling according to embodiments of the present invention, that certain amount of heat is conducted to the temperature monitoring and/or control element much faster. In order to avoid having to adjust the respective temperature thresholds, one may thus consider including cutout portion 1050 as described herein.

Figure 11:
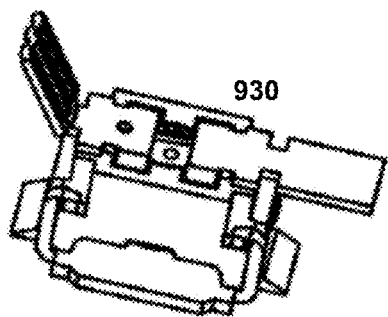
FIG. 11 shows schematically and exemplarily an exploded view of a detail from the temperature monitoring and/or control system of FIG. 10.
Figure 11:
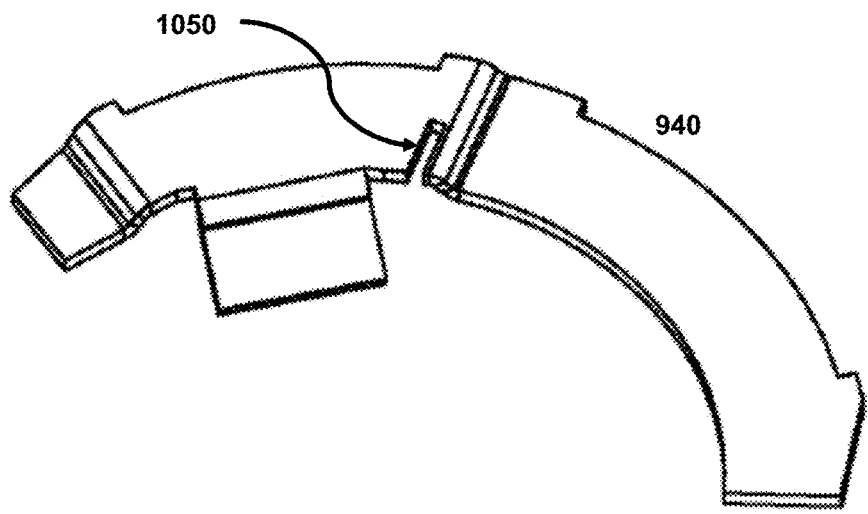
Figure 11:
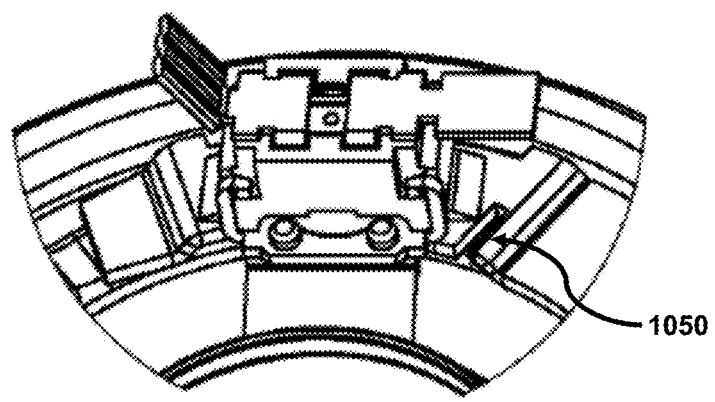

FIG. 11 shows schematically and exemplarily an exploded view of a detail from the temperature monitoring and/or control system of FIG. 10. Temperature monitoring and/or control element 930 is shown on the top. Carrier plate 940 comprising cutout portion 1050 is shown in the center. The mounted combination of temperature monitoring and/or control element 930 and carrier plate 940 is shown in the bottom, where cutout portion 1050 is visible as well.

Figure 12:
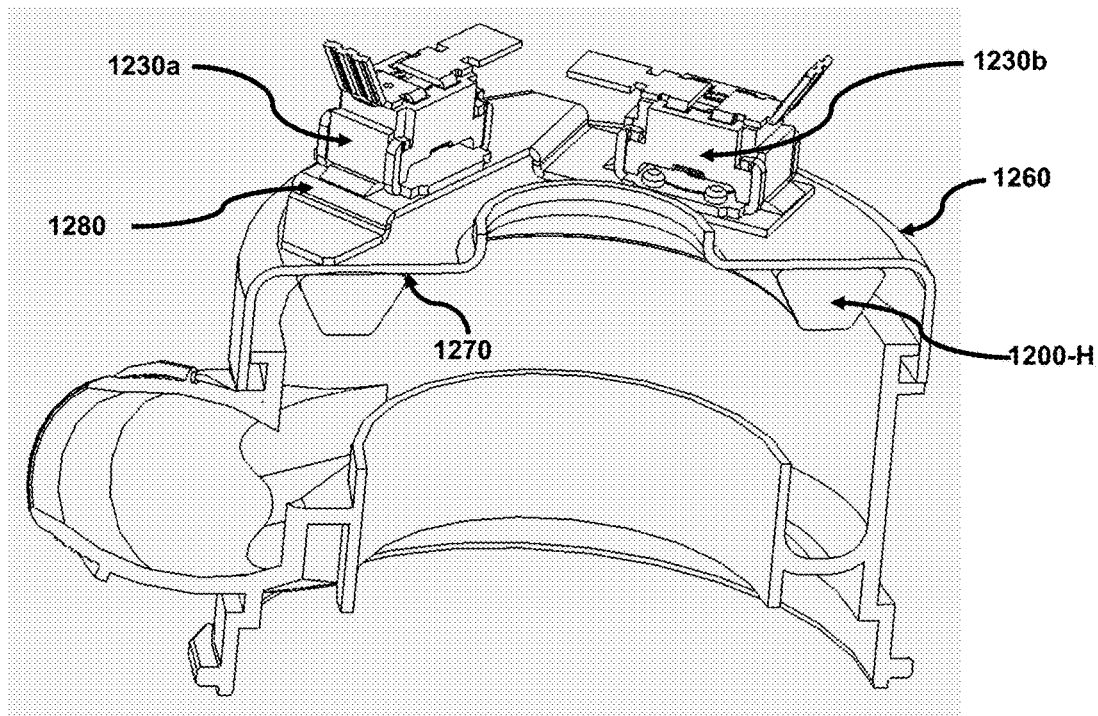
FIG. 12 shows schematically and exemplarily a further embodiment of a temperature monitoring and/or control system comprising temperature monitoring and/or control elements.

FIG. 12 shows schematically and exemplarily a further embodiment of a temperature monitoring and/or control system comprising temperature monitoring and/or control elements. The temperature monitoring and/or control system differs from the temperature monitoring and/or control systems discussed above in that its construction is optimized for an all-aluminum option.

In particular, there are shown temperature monitoring and/or control elements 1230*a*, 1230*b*. Preferably, temperature monitoring and/or control elements 1230*a*, 1230*b* are laser-welded onto thermal bridge 1280. Thermal bridge 1280 is preferably composed of AlMg3. However, aluminum alloys Al99,5 and AlMg1 are suitable as well. As shown in FIG. 12, thermal bridge 1280 is preferably mounted on casing portion 1260. Casing portion 1260 is preferably composed of AlMg3. However, aluminum alloys Al99,5 and AlMg1 are suitable as well. Thermal bridge 1280 is preferably mounted on casing portion 1260 by soldering or laser-welding. In FIG. 12, casing portion 1260 is shaped like a circular disc. However, other shapes of casing portion 1260 are conceivable to the skilled person as well. Inner side 1270 of casing portion 1260 is preferably coated with a nonstick coating. The nonstick coating is preferably composed of a ceramics-based material. Additionally and/or alternatively, the nonstick coating is preferably produced by means of a sol-gel process. By employing a ceramics-based nonstick coating, the aluminum surfaces may be rendered dishwasher-safe. As can further be seen from FIG. 12, heating unit 1200-H is directly attached to casing portion 1260. In the embodiment shown, heating unit 1200-H exhibits a trapezoid cross-section. However, other cross section shapes of heating unit 1200-H are conceivable to the skilled person. Heating unit 1200-H is in full area contact with at least one of the inside walls of casing portion 1260. Consequently, heat produced by heating unit 1200-H is transferred to the medium which is disposed on the wet side of casing portion 1260 and which is to be heated.

Figure 13:
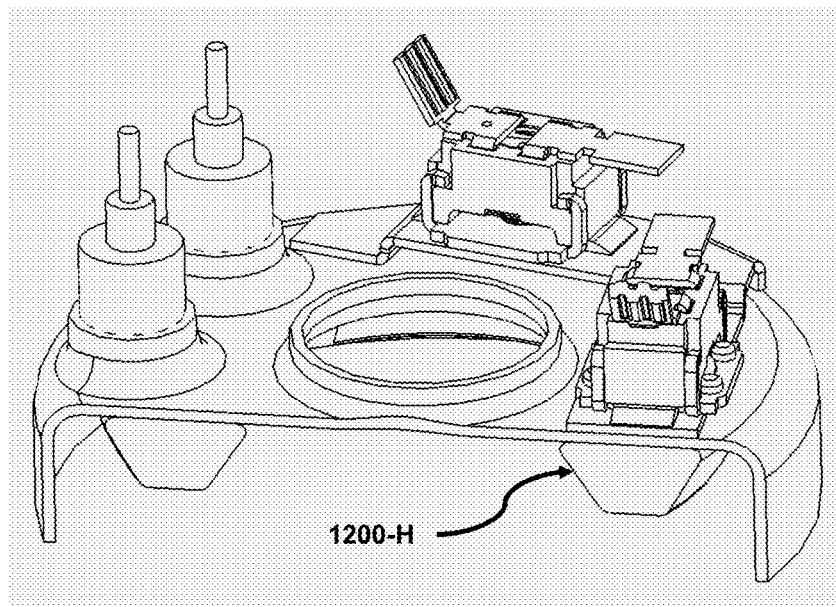
FIG. 13 shows schematically and exemplarily another view of the temperature monitoring and/or control system of FIG. 12.

FIG. 13 shows schematically and exemplarily another view of the temperature monitoring and/or control system of FIG. 12. In the embodiment shown herein, an essential part of an upper surface of heating unit 1200-H is soldered to casing portion 1260.

A list of possible manufacturing methods comprises, but is not limited to, half-automatic assembly and fully-automatic assembly. The beveled edge geometry described herein is preferably optimized for an automatic positioning of the temperature monitoring and/or control elements according to embodiments of the present invention. That is, by choosing a bevel angle of preferably 25° to 35°, the bevel surface visible from the direction of laser beam 540 can be kept sufficiently large so that a possible misalignment of the temperature monitoring and/or control system components can be compensated for.

Figure 14:
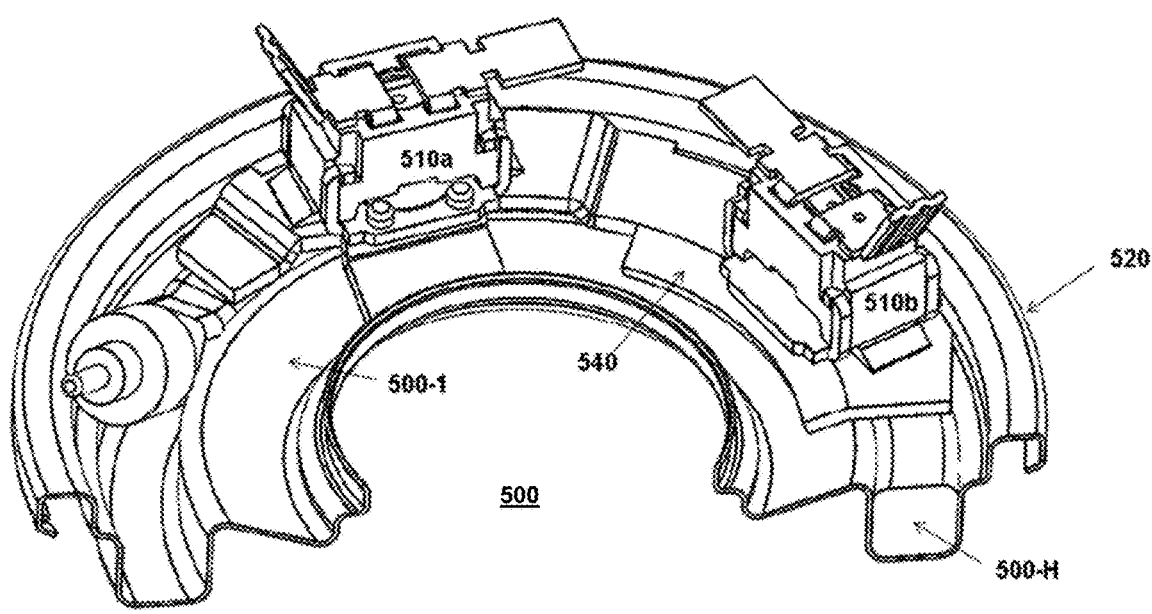
FIG. 14 shows schematically and exemplarily a further embodiment of the temperature monitoring and/or control system comprising temperature monitoring and/or control elements.

FIG. 14 shows schematically and exemplarily an embodiment of a method for producing a heating system component. In a first step 1410, the method comprises providing a temperature monitoring and/or control unit comprising a lower surface. In a second step 1420, the method comprises providing a carrier unit comprising an upper surface. In a third step 1430, the method comprises contacting at least a part of said lower surface of said temperature monitoring and/or control unit with at least a part of said upper surface of said carrier unit. In a further optional step 1450, the method comprises beveling an edge of a lower part of said temperature monitoring and/or control unit to obtain a beveled edge, wherein said beveled edge comprises a bevel angle of less than 90°. In a final step 1440, the method comprises welding, preferably laser-welding, said lower surface of said temperature monitoring and/or control unit and said upper surface of said carrier unit to each other. Preferably, said welding is carried out essentially along said beveled edge obtained in step 1450.

FIG. 14 shows schematically and exemplarily a further embodiment of a temperature monitoring and/or control system being similar to the embodiment shown in and described in conjunction with FIGS. 5A to 5C. For the components of the embodiment according to FIG. 14 having an identical or similar design and/or an identical or similar functionality compared to the components described in conjunction with the embodiment of FIGS. 5A to 5C, the same reference signs are used. Moreover, in the following, only the differences between the embodiment according to FIG. 14 compared to the embodiment described in conjunction with FIGS. 5A to 5C are described.

As can be seen from FIG. 14, the temperature monitoring and/or control system 500 of this embodiment comprises temperature monitoring and/or control units 510*a*, 510*b*. The temperature monitoring and/or control unit 510*b* is additionally provided with a connection 540 connecting the lower surface of temperature monitoring and/or control unit 510*b* with a section of circular disc 500-10 of carrier unit 520. Connection 540 is integrally formed with the lower surface of temperature monitoring and/or control unit 510*b*. The part or section of circular disc 500-10 of carrier unit 520 is not heated directly by heating unit 500-H, instead it is cooled by the medium to be heated by heating unit 500-H since this medium flows on the other side of circular plate 500-10. Connection 540 can also be fixed to circular disc 500-10 by laser-welding. Connection 540 is provided for a cooling of temperature monitoring and/or control unit 510*b* in case that the transfer of the heat generated by heating unit 500-H is disturbed, for example, due to a calcium deposit on the outer surface of circular disc 500-10 of carrier unit 520 in the area of heating unit 500-H which is in contact with the medium. As can be seen from FIG. 14, connection 540 can be designed such that it follows the contour of the non-heated area of circular disc 500-10 of carrier unit 520 when viewing in a cross-section. Moreover, connection 540 can be in the shape of a segment of a circle. The length of the arc of circle can be chosen in accordance with the need to cool temperature monitoring and/or control unit 500*b*.

Figure 15:
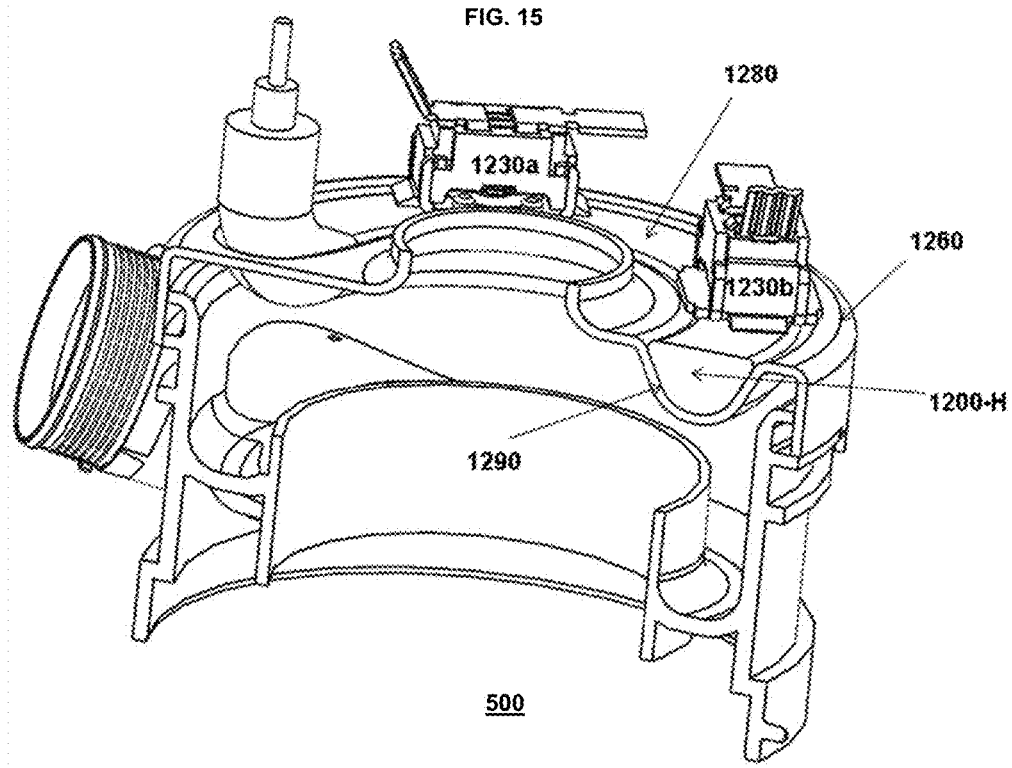
FIG. 15 shows schematically and exemplarily a further embodiment of a temperature monitoring and/or control system comprising temperature monitoring and/or control elements.

FIG. 15 shows schematically and exemplarily a further embodiment of a temperature monitoring and/or control system being similar to the embodiment shown and described in conjunction with FIGS. 12 and 13. For the components of the embodiment according to FIG. 15 having an identical or similar design and/or an identical or similar functionality as the components shown in and described in accordance with the embodiments of FIGS. 12 and 13, same reference signs are used. Moreover, only the differences between the embodiments according to FIGS. 12 and 13 and the embodiments of FIG. 15 are described.

As shown in FIG. 15, casing portion 1260 for receiving temperature monitoring and/or control units or elements 1230*a*, 1230*b* comprises a recess 1290 for receiving heating unit 1200-H. The contour of recess 1290 corresponds to the outer contour of heating unit 500-H. In the embodiment shown in FIG. 15, heating unit 500-H has the cross-sectional shape of a triangle with rounded corners so that the contour of recess 1290 is shaped along two sides of the triangle and one corner. The dimensions of recess 1290 are such that the sides of heating unit 1200-H are in close contact with recess 1290. As also can be seen from FIG. 15, heating unit 500-H is fixed to casing portion 1260 via laser-welding. The laser welding is such that the other two corners of the triangle-shaped heating unit 1200-a are welded to casing portion 1260.

Moreover, temperature monitoring and/or control unit or element 1230*b* is laser welded directly on the top surface of heating unit 1200-H. The other temperature monitoring and/or control unit or element 1230a is still attached to thermal bridge 1280.

Casing portion 1260 has a protection covering as already mentioned or is made of roll-composite aluminum sheet which is provided on side of the medium with coverage of stainless steel.

An example application of one or more embodiments of the present invention generally relates to situations where a fixed temperature needs to be monitored or controlled and a maximum temperature must not be exceeded, for example in household appliances such as dishwashers, dryers, and washing machines, small electrical appliances such as coffeemakers, irons, steam generators etc. or in electrically monitored water heaters. Embodiments of the present invention may be used protect electric heating elements.

The temperature monitoring and/or control unit may comprise one or more temperature monitoring and/or control elements, such as, e.g., safety devices.

Other variations to the disclosed embodiments can be understood and effected by those skilled in the art from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like measuring a temperature performed by one or several units or devices can be performed by any other number of units or devices. For example, measuring a temperature can be performed by a single temperature monitoring and/or control unit or by any other number of different units. The determinations and/or the control of the heating system for heating fluid media can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

One embodiment of the present invention relates to a heating system component comprising: a temperature monitoring and/or control unit comprising a lower surface, and a carrier unit comprising an upper surface. At least a part of said lower surface of said temperature monitoring and/or control unit is in thermal contact with at least a part of said upper surface of said carrier unit. Said lower surface of said temperature monitoring and/or control unit and said upper surface of said carrier unit are attached to each other by means of a welded seam, preferably by means of a laser-welded seam.

Aspects of the various embodiments described above can be combined to provide further embodiments. Additionally, this application claims priority to European Application No. 14173711.4-1602, filed Jun. 24, 2014, and European Application No. 15173012.4, filed Jun. 19, 2015, the entire contents of which are hereby incorporated by reference. Aspects of the embodiments can be modified, if necessary to employ concepts of the applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A heating system component, comprising:
    a temperature monitoring and/or control unit comprising a lower surface and a lower part having a beveled edge adjacent the lower surface, the beveled edge comprising a bevel angle of less than 90°;
    a carrier unit comprising an upper surface;
    wherein at least a part of said lower surface of said temperature monitoring and/or control unit is in thermal contact with at least a part of said upper surface of said carrier unit; and
    wherein said lower surface of said temperature monitoring and/or control unit and said upper surface of said carrier unit are attached to each other by a welded seam located essentially along said beveled edge.

2. The heating system component of claim 1 wherein said bevel angle ranges between 5° and 55°.

3. The heating system component of claim 1 wherein said temperature monitoring and/or control unit is configured to measure a temperature, to compare said temperature to a predefined temperature limit, and to output a control signal based on said comparison.

4. The heating system component of claim 3 wherein said control signal comprises information on a desired switching state of a heating unit.

5. The heating system component of claim 1 wherein:
    said lower surface of said temperature monitoring and/or control unit comprises at least one first protrusion and/or recess;
    said upper surface of said carrier unit comprises at least one second recess and/or protrusion; and
    said first protrusion and/or recess corresponds to said second recess and/or protrusion.

6. The heating system component of claim 1 wherein said lower surface of said temperature monitoring and/or control unit comprises a weldable aluminum alloy or an aluminum-steel compound material.

7. The heating system component of claim 1 wherein said upper surface of said carrier unit comprises at least one of aluminum alloys Al99,5, AlMg1, or AlMg3.

8. The heating system component of claim 1 wherein said temperature monitoring and/or control unit comprises at least one temperature monitoring and/or control element having a lower surface which is smaller than said lower surface of said temperature monitoring and/or control unit.

9. The heating system component of claim 1, wherein said lower surface comprises a connection unit have adapted to connect the lower surface of said temperature mounting and/or controlled unit with a section of a circular disc of said carrier unit.

10. The heating system component of claim 1,
    wherein said carrier unit comprises a recess,
    wherein the heating system further comprises a heating unit welded within said recess, and
    wherein said temperature mounting and/or control unit is directly mounted on a top surface of the heating unit by a laser-welded seam.

11. A heating system for heating fluid media, in particular for domestic appliances, comprising:
  a heating system component according to claim 1;
  a heating unit arranged on said carrier unit; and
  wherein said temperature monitoring and/or control unit is configured to measure a temperature of said heating unit.

12. The heating system of claim 11, wherein said heating system comprises a casing portion, wherein said heating unit is mounted to said casing portion, and wherein said casing portion comprises aluminum.

13. A method for producing a heating system component, comprising:
  providing a temperature monitoring and/or control unit comprising a lower surface and a lower part having a beveled edge adjacent the lower surface, the beveled edge comprising a bevel angle of less than 90°;
  providing a carrier unit comprising an upper surface;
  contacting at least a part of said lower surface of said temperature monitoring and/or control unit with at least a part of said upper surface of said carrier unit;
  welding said lower surface of said temperature monitoring and/or control unit and said upper surface of said carrier unit to each other essentially along said beveled edge.

14. The method of claim 13 wherein said welding comprises laser-welding by employing a laser beam, wherein said laser beam is directed essentially perpendicular to a surface of said temperature monitoring and/or control unit.

15. The method of claim 14 wherein said laser beam comprises a power of between 0.5 kW and 1.5 kW.

* * * * *